United States Patent
Sebire et al.

(10) Patent No.: US 8,886,177 B2
(45) Date of Patent: Nov. 11, 2014

(54) MEASUREMENT REPORTING OF INTER-RAT CELLS OF MORE THAN ONE RAT IN GERAN

(75) Inventors: Guillaume Jacques Sebire, Espoo (FI);
Harri Aatos Jokinen, Pertteli (FI);
Leonardo Provvedi, Eastleigh (GB)

(73) Assignee: Nokia Corporation, Espoo (FI)

( * ) Notice: Subject to any disclaimer, the term of this patent is extended or adjusted under 35 U.S.C. 154(b) by 197 days.

(21) Appl. No.: 13/521,972

(22) PCT Filed: Jan. 26, 2011

(86) PCT No.: PCT/IB2011/050344
§ 371 (c)(1),
(2), (4) Date: Jul. 12, 2012

(87) PCT Pub. No.: WO2011/092636
PCT Pub. Date: Aug. 4, 2011

(65) Prior Publication Data
US 2012/0295606 A1    Nov. 22, 2012

Related U.S. Application Data

(60) Provisional application No. 61/298,450, filed on Jan. 26, 2010.

(51) Int. Cl.
*H04W 4/00* (2009.01)
*H04W 36/00* (2009.01)
*H04W 36/14* (2009.01)

(52) U.S. Cl.
CPC .......... *H04W 36/0094* (2013.01); *H04W 36/14* (2013.01)
USPC ............ 455/422.1; 455/436; 455/67.11; 455/226.1

(58) Field of Classification Search
CPC ............ H04W 36/00; H04W 36/0055; H04W 36/0061; H04W 36/0083; H04W 36/30; H04W 36/36; H04W 36/38
USPC ............................ 455/436–438, 67.11, 226.1
See application file for complete search history.

(56) References Cited

U.S. PATENT DOCUMENTS 7,313,116 B2   12/2007  Lee et al.
8,582,530 B2 * 11/2013  Binzel et al. .................. 370/331
(Continued)

FOREIGN PATENT DOCUMENTS

EP   1503606 B1   3/2008
EP   2123080 A1   11/2009
(Continued)

OTHER PUBLICATIONS

"3rd Generation Partnership Project; Technical Specification Group GSM/EDGE Radio Access Network; Radio Subsystem Link Control (Release 9)", 3GPP TS 45.008, V9.1.0, Nov. 2009, pp. 1-140.

(Continued)

*Primary Examiner* — Temica M Beamer
(74) *Attorney, Agent, or Firm* — Mintz, Levin, Cohn, Ferris, Glovsky & Popeo, P.C.

(57) ABSTRACT

Methods and apparatus, including computer program products, are provided for measurement reporting In one aspect there is provided a method. The method may include receiving, at a user equipment from a base station, a first message providing one or more parameters for measurement reporting, selecting one or more first cells from among a plurality of cells, wherein the selecting is based on at least one comparison value determined based on at least one reporting threshold defined for at least one of a plurality of radio access technologies being used by at least one of the plurality of cells, wherein the at least one reporting threshold is further defined based on at least one measurement quantity used for the at least one of a plurality of radio access technologies, and sending, by the user equipment to the base station, one or more measurement results for the selected one or more first cells, the one or more measurement results included m the measurement report message, when the measurement report message lacks capacity to report valid measurement results for each of the plurality of cells, wherein the one or more results are included based on the at least one comparison value including the at least one reporting threshold. Related apparatus, systems, methods, and articles are also described.

24 Claims, 7 Drawing Sheets

(56) References Cited

U.S. PATENT DOCUMENTS

| | | | |
|---|---|---|---|
| 2007/0004445 | A1 | 1/2007 | Dorsey et al. |
| 2008/0101318 | A1 | 5/2008 | Taaghol et al. |
| 2008/0176564 | A1 | 7/2008 | Eerolainen |
| 2010/0323631 | A1* | 12/2010 | Martin et al. ............ 455/67.11 |

FOREIGN PATENT DOCUMENTS

| | | |
|---|---|---|
| JP | 2004-349976 A | 12/2004 |
| JP | 2007-336392 A | 12/2007 |
| WO | 2008/037552 A1 | 4/2008 |
| WO | 2008/102252 A1 | 8/2008 |
| WO | 2008/103745 A1 | 8/2008 |
| WO | 2008/112126 A1 | 9/2008 |
| WO | 2008/157800 A1 | 12/2008 |
| WO | 2009/021009 A1 | 2/2009 |
| WO | 2009/036252 A1 | 3/2009 |
| WO | 2009/045070 A2 | 4/2009 |

OTHER PUBLICATIONS

"3rd Generation Partnership Project; Technical Specification Group Radio Access Network; User Equipment (UE) Procedures in Idle Mode and Procedures for Cell Reselection in Connected Mode (Release 8)", 3GPP TS 25.304, V8.7.0, Sep. 2009, pp. 1-49.

"3rd Generation Partnership Project; Technical Specification Group Radio Access Network; Evolved Universal Terrestrial Radio Access (E-UTRA); User Equipment (UE) Procedures in Idle Mode (Release 8)", 3GPP TS 36.304, V8.7.0, Sep. 2009, pp. 1-30.

"Clarification on XXX_Reporting_Offset for E-UTRAN", 3GPP TSG-GERAN#44, GP-092193, Agenda Item: 7.1.5.2.2, LG Electronics Inc., Nov. 16-20, 2009, pp. 1-2.

"ETSI STC SMG2", Tdoc SMG2 xxx/00, Draft Meeting report, Mar. 6-8, 2000, 11 pages.

"3rd Generation Partnership Project; Technical Specification Group Radio Access Network; Evolved Universal Terrestrial Radio Access (E-UTRAN); LTE Physical Layer—General Description (Release 9)", 3GPP TS 36.201, V9.0.0, Dec. 2009, pp. 1-13.

"3rd Generation Partnership Project; Technical Specification Group Radio Access Network; Evolved Universal Terrestrial Radio Access (E-UTRAN); Physical Channels and Modulation (Release 9)", 3GPP TS 36.211, V9.0.0, Dec. 2009, pp. 1-85.

"3rd Generation Partnership Project; Technical Specification Group Radio Access Network; Evolved Universal Terrestrial Radio Access (E-UTRA); Multiplexing and Channel Coding (Release 9)", 3GPP TS 36.212, V9.0.0, Dec. 2009, pp. 1-61.

"3rd Generation Partnership Project; Technical Specification Group Radio Access Network; Evolved Universal Terrestrial Radio Access (E-TRAN); Physical Layer Procedures (Release 9)", 3GPP TS 36.213, V9.0.1, Dec. 2009, pp. 1-79.

"3rd Generation Partnership Project; Technical Specification Group Radio Access Network; Evolved Universal Terrestrial Radio Access (E-UTRA); Physical Layer—Measurements (Release 9)", 3GPP TS 36.214, V9.0.0, Dec. 2009, pp. 1-13.

International Search Report and Written Opinion received for corresponding International Patent Application No. PCT/IB2011/050344, dated Apr. 15, 2011, 9 pages.

Office action received for corresponding Japanese Patent Application No. 2012-548530, dated Aug. 27, 2013, 5 pages of office action and 4 pages of Office Action Translation.

Final office action received for corresponding Japanese Patent Application No. 2012-548530, dated Mar. 10, 2014, 3 pages of office action and 3 pages of Office Action Translation.

Office action received for corresponding Korean Patent Application No. 2012-7022302, dated Jan. 16, 2014, 3 pages of Office Action, No English Language Translation available.

"Radio Subsystem Link Control", 3rd Generation Partnership Project; Technical Specification Group GSM/EDGE Radio Access Network, 3GPP TS 45.008, V8.5.0, Dec. 8, 2009.

* cited by examiner

MEASUREMENT REPORTING OF INTER-RAT CELLS OF MORE THAN ONE RAT IN GERAN

RELATED APPLICATION

This application was originally filed as PCT Application No. PCT/IB2011/050344 filed Jan. 26, 2011 which claims priority benefit to United States Provisional Patent Application No. 61/298450, filed Jan. 26, 2010.

FIELD

The subject matter described herein relates to wireless communications and, in particular, inter-working between one or more different radio access technologies (RATs) including, for example, GERAN, UTRAN, E-UTRAN, cdma2000, and the like.

BACKGROUND

In the current GSM requirements for measurement reporting in 3GPP TS 45.008, titled "$3^{rd}$ Generation Partnership Project; Technical Specification Group GSM/Edge Radio Access Network; Radio subsystem link control (Release 9), 2009-11, (hereinafter 3GPP TS 45.008), the network may configure and/or request that the user equipment (e.g., a mobile station) during an active connection (e.g., a voice call or a packet data transfer) report the serving cell and the neighboring cell measurements via measurements reports and/or enhanced measurement reports. These measurements enable the network to decide whether the user equipment should be directed to another neighboring cell by means of e.g. handover, cell change order, etc. For example, the user equipment may measure the signal level and/or signal quality of the serving GSM cell (e.g., the signal level of the received broadcast control channel carried by the downlink of the base station of the serving cell), and measure the signal level and/or signal quality of a neighboring cell (e.g., the signal level of the received broadcast control channel carried by the downlink of the base station of the neighboring cell).

The reported measurements allow the network to determine whether a handover or a cell change order should be initiated from the serving cell to the neighboring cell.

When reporting the measurements of neighboring cells, the user equipment may be required to report, in addition to measurements of GSM cells, one or more measurements of neighboring inter-RAT cells, e.g., neighboring cells of other radio access technologies, such as UTRAN or E-UTRAN. Due to the limited space in the messages for measurement reporting, there may not be sufficient space to report measurements for all of the valid inter-RAT neighboring cells to the network. As a consequence, 3GPP TS 45.008 at sub clause 8.4.8.1 (which relates to enhanced measurement reporting) states "the cells shall be reported that have the highest sum of the reported value (RXLEV or as defined in sub clause 8.1.5) and the parameter XXX_REPORTING_OFFSET for respective radio access technology/mode." Given the case of the user equipment supporting more than one RAT and a reporting message with insufficient space to report all valid cells, the user equipment sums the measured (and/or reported) value of received signal level or signal quality, and an offset parameter, XXX_REPORTING_OFFSET, for each of the valid cells of the different RATs, such as UTRAN and E-UTRAN cells. Next, the user equipment compares the sums for each of the RATs. The measurements for the cell(s) with the highest calculated sum among the RATs are then reported.

However, a comparison of the calculated sums may not be meaningful as the levels for different RATs (e.g., received signal code power (RSCP) for UTRAN and received signal reference power (RSRP) for E-UTRAN, and the like) may not lend themselves to a direct comparison.

For example, a typical measurement report message from the user equipment to the network may only include 6 positions minus some positions for reporting the measurements of the serving RAT. In that case, the user equipment may have a quantity, N, of valid neighboring UTRAN cells to be reported (e.g., using enhanced reporting) to the network, and a quantity, M, of valid neighboring E-UTRAN cells to be reported to the network. But the measurement report message which is sent from the user equipment to the network may have fewer available positions than the quantity of N+M. Although the network can set an upper limit to the values of N and M by means of parameters XXX_MULTIRAT_REPORTING signaled by the network to the user equipment, this may not always prevent the events described above from occurring. When that is the case, 3GPP TS 45.008 requires that the user equipment reports the neighboring cell(s) according to the highest sum approach noted above and described in TS 45.008 sub clause 8.4.8.1.

Another case where similar measurement reporting issues may occur is in TS 45.008, sub clause 8.4.7 (which relates to normal measurement reporting rather than the enhanced measurement reporting of sub clause 8.4.8), stating: "If there are still remaining positions, these shall be used to report the next best valid cells in other radio access technologies for which XXX_MULTIRAT_REPORTING is non-zero. The best cell is the cell with the highest reported value (see sub clause 8.1.5)." Even in the example of sub clause 8.4.7, the user equipment would need to prioritize between cells of different RATs to decide which cells should be reported to the network in the available spaces of the measurement report message, assuming that the number of cells to be reported is higher than the number of available positions in the measurement report message.

There is also the case where values for the measurement report are different types of values. For example, the value of a RAT may be a signal level, such as RSCP for U IRAN or RSRP for E-UTRAN, and for another RAT may be signal quality, such as $E_c/N_0$ (i.e., energy per chip divided by the power spectral density of the interfering noise) for UTRAN or reference signal received quality (RSRQ) for E-UTRAN. In this example, the user equipment may be required to compare the $E_c/N_0$ value for UTRAN and RSRP value for E-UTRAN and then decide which cell has the highest sum (possibly with the addition of the corresponding XXX_REPORTING_OFFSET) for inclusion in the measurement report. This example illustrates that comparisons of such different types of values may comply with TS 45.008 sub clauses 8.4.7 and 8.4.8.1 but not provide a meaningful comparison to determine which neighboring cells should be reported to the network.

SUMMARY

Methods and apparatus, including computer program products, are provided for measurement reporting.

In one aspect there is provided a method. The method may include receiving, at a user equipment from a base station, a first message providing one or more parameters for measurement reporting; selecting one or more first cells from among a plurality of cells, wherein the selecting is based on at least one comparison value determined based on at least one reporting threshold defined for at least one of a plurality of radio access technologies being used by at least one of the plurality of cells, wherein the at least one reporting threshold is further defined based on at least one measurement quantity used for the at least one of a plurality of radio access technologies; and sending, by the user equipment to the base station, one or more measurement results for the selected one or more first cells, the one or more measurement results included in the measurement report message, when the measurement report message lacks capacity to report valid measurement results for each of the plurality of cells, wherein the one or more results are included based on the at least one comparison value including the at least one reporting threshold.

In one aspect there is provided a method. The method may include sending, from a base station to a user equipment, a first message providing one or more parameters for measurement reporting; and receiving a measurement report message including one or more measurement results selected based on one or more comparison values determined based on at least one reporting threshold defined for at least one of a plurality of radio access technologies being used by at least one of a plurality of cells, when the measurement report sent by the user equipment lacks capacity to report to the base station measured values for a plurality of cells.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Figure 1:
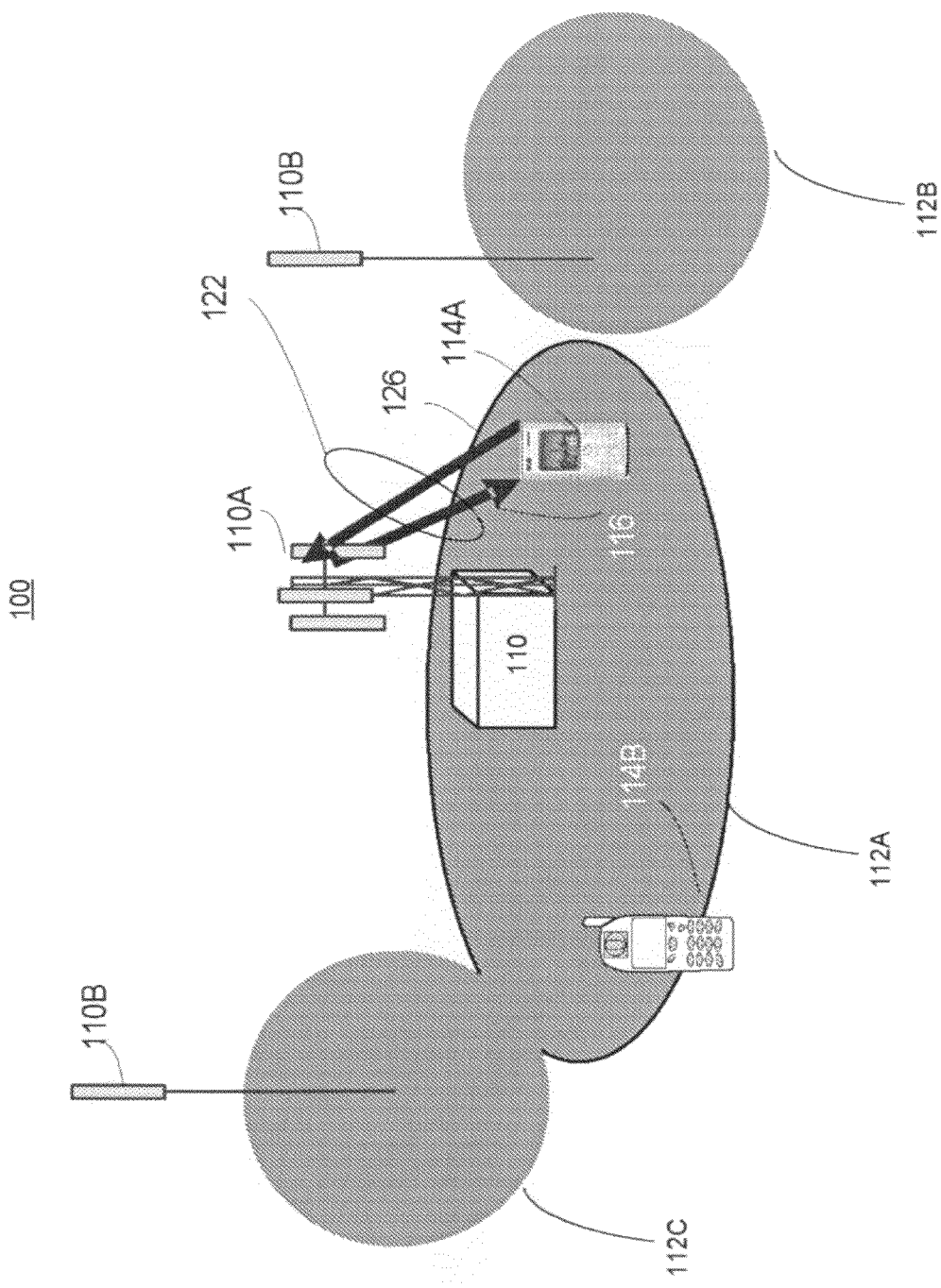
FIG. 1 depicts a block diagram of a wireless communication system.

Like labels are used to refer to same or similar items in the drawings.

DETAILED DESCRIPTION

Instead of comparing the reported values among neighboring cells (which in some cases may further include the addition of an offset), the user equipment may compare, in accordance with the subject matter described herein, the reported values for different neighboring cells (which may further include the addition of an offset) minus a reporting threshold. The reporting threshold is a level below which the measurement result is not typically reported to the network. This reporting threshold parameter may be defined for each of a plurality of different RATs. Moreover, the network (e.g., a base station, radio network controller, and any other network node) may signal the reporting threshold to the user equipment. Furthermore, the mechanisms described herein (including the reporting threshold) may not require the introduction of additional parameters in specifications, such as for example the GERAN specifications.

Before providing additional examples and description for the reporting threshold noted above, an example system environment is described at FIG. 1. FIG. 1 is a simplified functional block diagram of a wireless communication system 100. The wireless communication system 100 includes base stations 110A-C supporting corresponding service or coverage areas 112A-C (also referred to as a cell). The base stations 110A-C are capable of communicating with wireless devices, such as user equipments 114A-B, within coverage areas 112-A-C. Although FIG. 1 depicts a three base stations 110A-C, three cells 112A-C, and two user equipments 114A-B, the wireless communication system 100 may include other quantities of base stations, cells, and user equipments as well.

In some implementations, the user equipment 114A may be able to access a plurality of cells 112A-C served by base stations 110A-C, in which case the user equipment 114A may be directed by the network to make measurements of not only the serving cell (e.g., cell 112A) but also neighboring cells (e.g., cells 112B-C). One or more of these measurements may be reported from the user equipment 114A to the network (e.g., a base station, etc.) to determine whether user equipment 114A should change the cell (and the corresponding base station serving that cell) to which the user equipment 114A connects, e.g., as part of a handover or a cell change order.

The base stations 110A-C, in some implementations, may be implemented consistent with one or more standards referred to generally as GERAN (GSM/EDGE Radio Access Network), UTRAN (UMTS Terrestrial Radio Access Network), E-UTRAN (Evolved UTRAN, which is also referred to as Long Term Evolution(LTE)), and/or LTE-A (Long Term Evolution-Advanced), as well as any subsequent additions or revisions to those standards. For example, the base stations 110A-C may be implemented as an evolved Node B (eNB) type base station consistent with standards, such as 3GPP TS 36.201, "Evolved Universal Terrestrial Radio Access (E-UTRA); Long Term Evolution (LTE) physical layer; General description," 3GPP TS 36.211, "Evolved Universal Terrestrial Radio Access (E-UTRA); Physical channels and modulation," 3GPP TS 36.212, "Evolved Universal Terrestrial Radio Access (E-UTRA); Multiplexing and channel coding," 3GPP TS 36.213, "Evolved Universal Terrestrial Radio Access (E-UTRA); Physical layer procedures," 3GPP TS 36.214, "Evolved Universal Terrestrial Radio Access (E-UTRA); Physical layer—Measurements," and any subsequent additions or revisions to these and other 3GPP standards. Although the aforementioned standards are described, the base stations 110A-C may be implemented using other technologies and/or standards as well including, for example, GERAN.

Although FIG. 1 depicts an example of a configuration for the base stations 110A-C, the base stations 110A-C may be configured in other ways as well and include, for example, relays, cellular base station transceiver subsystems, gateways, access points, radio frequency (RF) repeaters, frame repeaters, nodes, and include access to other networks as well. For example, base stations 110A-C may have wired and/or wireless backhaul links to other network elements, such as other base stations, a radio network controller, a core network, a serving gateway, a mobility management entity, a serving GPRS (general packet radio service) support node, a network management system, and the like.

In some implementations, the wireless communication system 100 includes radio access links, such as link 122. For example, the access link 122 includes a downlink 116 for transmitting to the user equipment 114A and an uplink 126 for transmitting from user equipment 114A to the base station 110A. The downlink 116 and uplink 126 each represent a radio frequency (RF) signal. The RF signal may transport data, such as voice, video, images, Internet Protocol (IP) packets, control information, and any other type of information. The measurement report orders may be carried from the network to the user equipment via a downlink, such as downlink 116. Moreover, the user equipment may measure the signal level and signal quality of a cell by measuring aspects of the downlink. The measurement reports may be carried from the user equipment to the network via an uplink, such as uplink 116.

The user equipment 114A-B may be implemented as a mobile device and/or a stationary device. The user equipment 114A-B are often referred to as, for example, mobile stations, mobile units, subscriber stations, wireless terminals, or the like. A user equipment may be implemented as, for example, a wireless handheld device, a wireless plug-in accessory, or the like. In some cases, user equipment may include a processor, a computer-readable storage medium (e.g., memory, storage, and the like), a radio access mechanism, and a user interface. For example, the user equipment may take the form of a wireless telephone, a computer with a wireless connection to a network, or the like.

Figure 2:
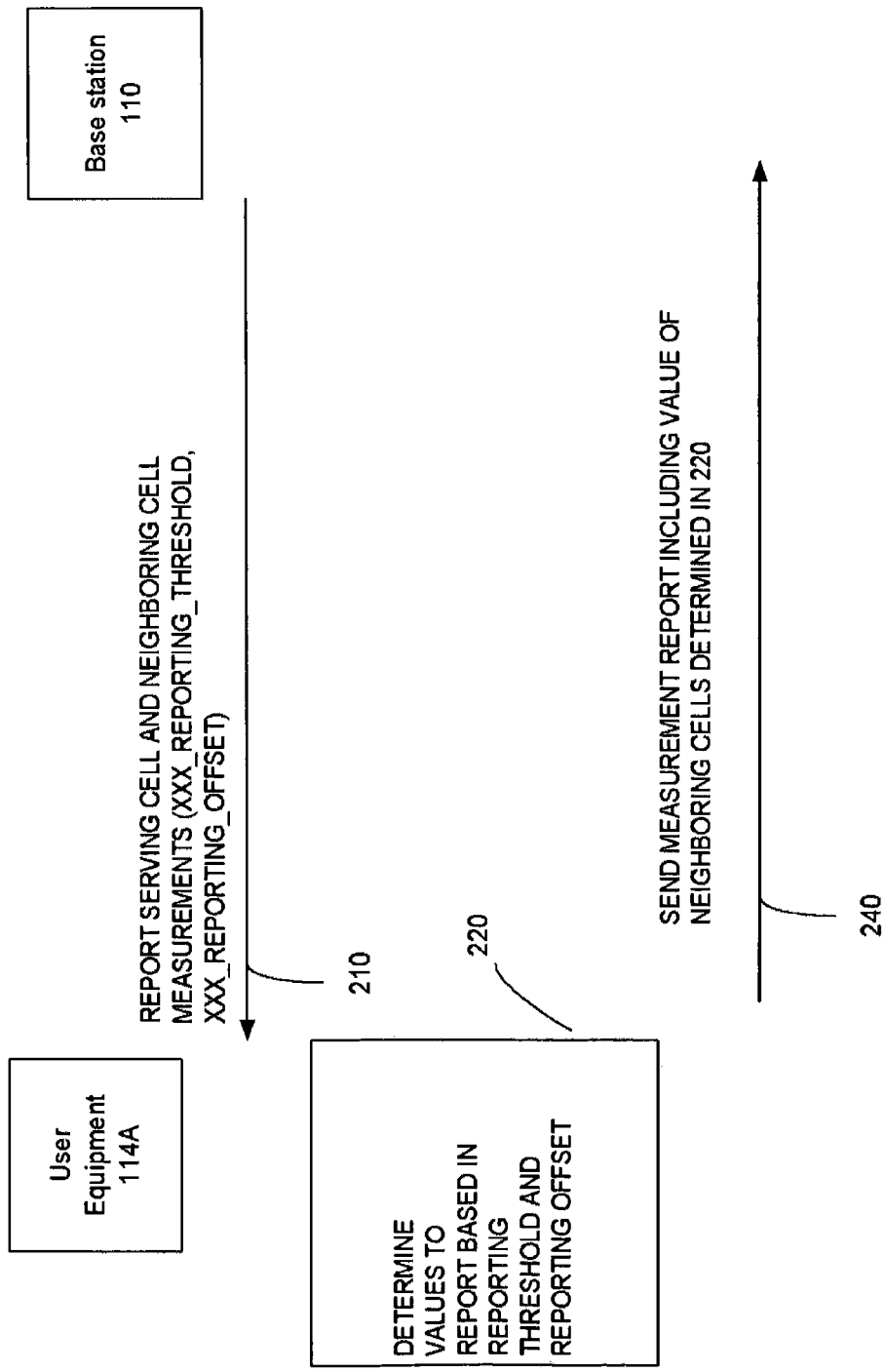
FIG. 2 depict a process 200 for measurement reporting between the user equipment and the base station.

FIG. 2 depicts a process 200 in which the reporting threshold is implemented.

At 210, the base station 110A may send a message to the user equipment 114A including parameters (e.g., configuration information, such as an offset, a reporting threshold, and the like) to configure measurement reporting at the user equipment. As noted, the message 210 may also include the reporting thresholds for different RATs. For example, the message 210 may include a reporting threshold, E-UTRAN_REPORTING_THRESHOLD, for E-UTRAN cells, and a reporting threshold, UTRAN_REPORTING_THRESHOLD, for UTRAN cells. The user equipment 114A may perform one or more measurements on the serving cell (which is the cell currently being accessed by the user equipment 114A) and any neighboring cells. The measurement values may include, for example, signal levels and/or signal quality values.

At 220, the user equipment 114A may determine the actual values to report in a reporting message based on the reporting threshold. The user equipment 114A may report measurements only for cells whose measured values are above the reporting threshold.

Moreover, the user equipment 114A may use the reporting thresholds to determine the values to report when the reporting message lacks the capacity (e.g., positions) to report measurement values for all the inter-RAT cells. For example, for each of the cells (e.g., neighboring cells some of which may use different RATs), the user equipment 114 may calculate a comparison value as follows:

$$CV = Qmeas\_XXX + XXX\_REPORTING\_OFFSET - XXX\_REPORTING\_THRESHOLD, \quad \text{EQN 1}$$

wherein

CV represents a comparison value which can be compared among RAT cells (e.g., among neighboring RAT cells), Qmeas_XXX represents the measured quantity (e.g., a signal level or a signal quality value of a neighboring cell of a given RAT as measured by the user equipment), "XXX" in EQN 1 is used to identify a given RAT, XXX_REPORTING_OFFSET represents an offset parameter for the given RAT (see e.g., message 210), and XXX_REPORTING_THRESHOLD represents the reporting threshold for the given RAT (see e.g., message 210).

The comparison value, CV, allows the user equipment to compare all of the valid cells (e.g., neighboring cells) being measured by the user equipment in order to generate the measurement report message. Given a measurement report message having limited capacity to allow reporting of all of the valid cells, the user equipment 114A uses the comparison value, CV, to determine which neighboring cells to report. For example, if the measurement report message has only two positions, one reserved for the serving cell and another for a neighboring cell, the user equipment 114A may select for reporting the neighboring cell with the highest comparison value, CV.

The Qmeas_XXX value may correspond to any value measured by the user equipment which is indicative of a signal level and/or a signal quality of a cell. For example, the user equipment may measure the received signal transmitted by a base station for a neighboring cell. The measured signal level may be used as Qmeas_XXX for the neighboring cell.

At 240, the user equipment sends the measurement report message to the network, e.g., base station 110. Returning to the previous example of the measurement report message having only two positions, the user equipment may report the measured value of the serving cell and report the measured value (which is some cases may differ from the comparison value, CV) of the neighboring cell selected at 220.

The process 200 allows a comparison of signal levels for different RATs. Given EQN 1, the comparison values may be in the form of relative signal levels (e.g., in relative dB units) rather than the actual measured levels (e.g., in dBm). Thus, even if the absolute ranges for the measurements are different (e.g., in TS 45.008 the range that can be reported for RSCP is from −116 dBm to −52 dBm, while the range for RSRP is from −140 dBm to −44 dBm), the relative values give an indication of how good a cell is with respect to a reference defined by the operator.

Moreover, by using the relative value with respect to a reporting threshold, a signal level value for a RAT may be compared with a signal quality value for another RAT. Even though the signal level and signal quality may have different dynamic ranges (e.g., the dynamic range for the signal level is typically 80-100 dB, while the dynamic range for the signal quality is about 15-20 dB), this may still offer a better comparison when compared to past approaches.

In this example, the dynamic ranges shown indicate that the signal quality would inevitably be lower than the signal level. Thus, comparing a signal quality and signal level would in this example likely lead to a meaningless comparison. Using the comparison value, CV, together with, in some cases, a scaling factor (which is described further below) to normalize the dynamic ranges of the different types of measurement values makes the comparison more meaningful. Returning to the above example of signal level varying between 80-100 dB and signal quality varying between about 15-20 dB, the comparison value, CV, and/or the scaling factor may be used to make the ranges of both signal level and signal quality about the same (e.g., 0-10 dB, 0.0-1.0, etc.) to provide a more meaningful comparison.

As noted, when comparing at 220 the signal level for a RAT and the signal quality for another RAT, the signal level value and/or the signal quality value may also be multiplied by a scaling factor, so that the dynamic ranges become about the same. In essence, the multiplication introduces a scaling factor that makes the range for comparison values based on the signal level and the range for comparison values based on the signal quality about the same. Therefore, the use of the scaling factor may allow a more meaningful comparison between the signal quality values and signal level values. Although the scaling factor may be implemented in a variety of ways, in some implementations, the scaled CV is determined as follows:

$$\frac{Qmeas\_XXX - XXX\_RT}{Qmeas\_XXX\_MAX - XXX\_RT}, \quad \text{EQN 2}$$

wherein
Qmeas XXX represents the measured quantity for a given RAT,
XXX_RT represents a reporting threshold for a given RAT,
$Qmeas_{XXX}$_MAX represents the maximum possible reported value, and
$1/(Qmeas_{XXX}\_MAX-XXX\_RT)$ represents the scaling factor.

In other implementations, the scaled CV is determined as follows:

$$\frac{Qmeas\_XXX + XXX\_REPORTING\_OFFSET - XXX\_RT}{Qmeas\_XXX\_MAX + XXX\_REPORTING\_OFFSET - XXX\_RT}, \quad \text{EQN 3}$$

wherein
Qmeas_XXX_MAX is the maximum value of the corresponding reported measure,
XXX_REPORTING OFFSET is the same as described above with respect to EQN 1; and
1/(Qmeas_XXX_MAX+XXX_REPORTING_OFFSET−XXX RT) represents the scaling factor.

EQN 3 may thus provide a percentage value indicating how good the cell is while taking into account the reporting thresholds and offsets. EQNs 2 and 3 above may provide a value between 0 and 1, which may be expressed as a percentage, wherein 0% corresponds to just the threshold and the maximum (100%) corresponds to the maximum that can be reached above the threshold. This provides an indication of by how much the measured quantity (which includes an offset in case of EQN 3) is above the reporting threshold. In any case, the scaled comparison values of EQNs 2 and 3 may be used instead of the CVs of EQN 1.

In implementations using the scaling factor, the measured quantities are processed using the scaling factor. For example, EQNs. 2 or 3 may process the measured quantities from neighboring cell(s). The user equipment ranks the scaled comparison values and selects the cells based on the ranking. For example, if the measurement report 240 includes sufficient capacity for 2 cells, then the user equipment selects the top two cells in the ranking of the scaled comparison values to report to the network in measurement report 240.

Figure 3:
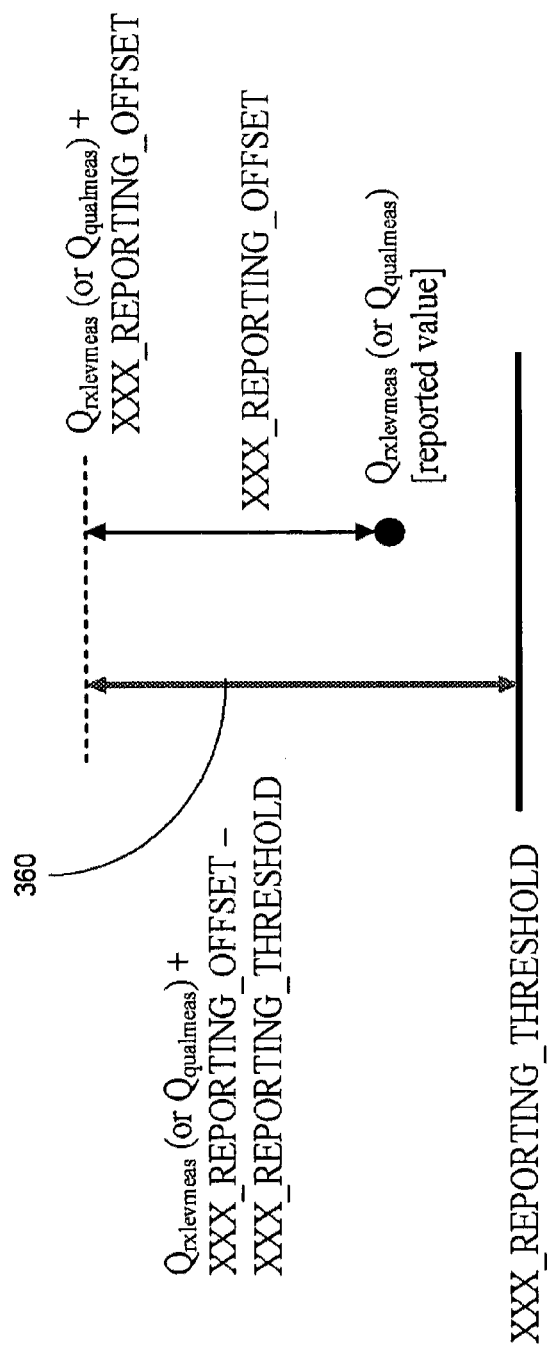
FIG. 3 is a plot of the reporting threshold used in connection with measurement reporting between the user equipment and the base station.

FIG. 3 depicts how the comparison values CV are calculated. Qrxlevmeas and Qqualmeas are the measured received level values (e.g., RS CP for UTRAN and RSRP for E-UTRAN) and/or the quality values (e.g., Ec/$N_0$ for UTRAN and RSRQ for E-UTRAN). The parameters XXX_REPORTING_THRESHOLD and XXX_REPORTING_OFFSET are defined in 3GPP TS 45.008. The quantity shown by line 360 is the CV used for the comparison among different cells to be reported.

Figure 4:
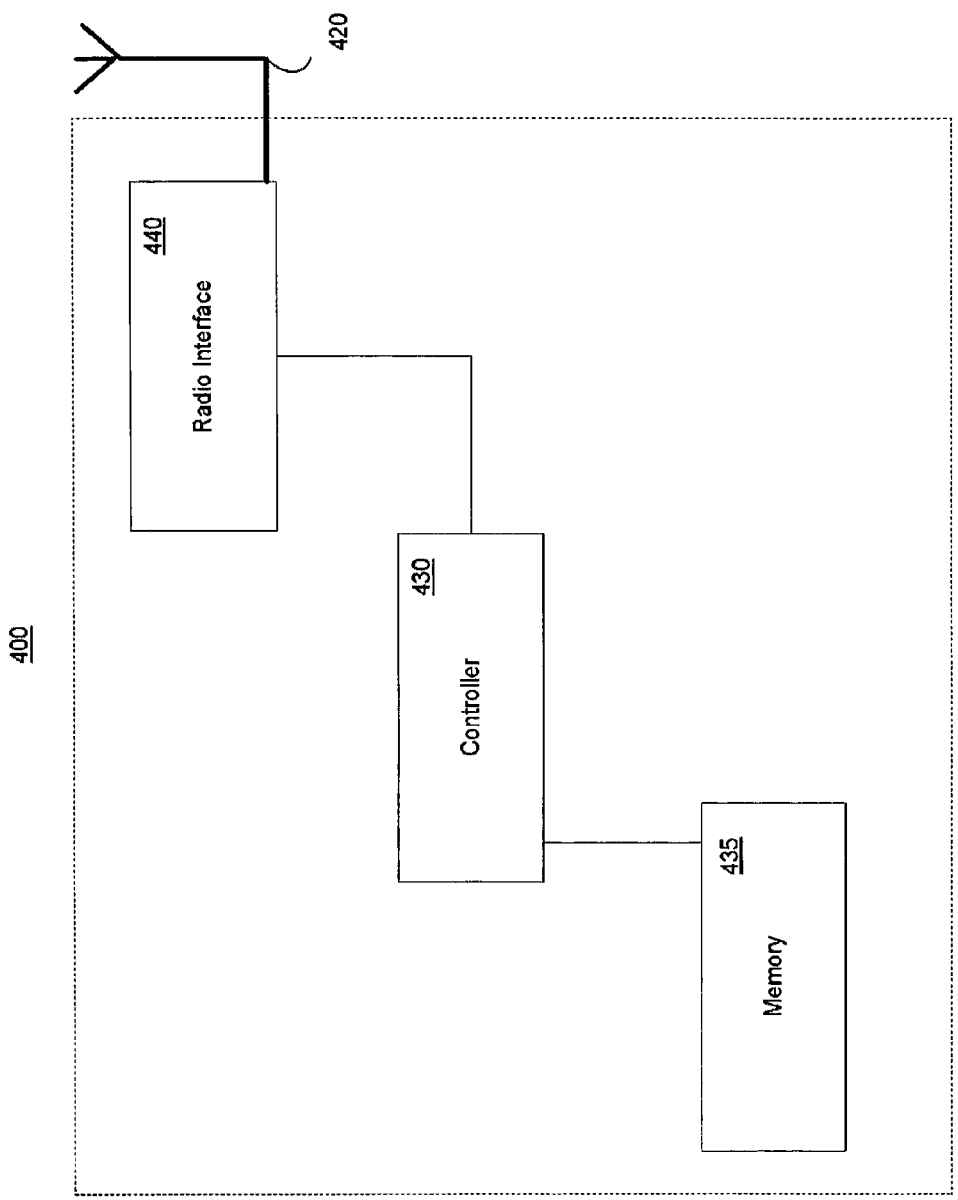
FIG. 4 depicts a base station.

FIG. 4 depicts an example implementation of a base station 400, which may be implemented at base station 110. The base station includes antenna(s) 420 configured to transmit via a downlink and configured to receive uplinks. The base station further includes a radio interface 440 coupled to the antenna 420, a processor 430 for controlling the base station 400 and for accessing and executing program code stored in memory 435. The radio interface 440 further includes other components, such as filters, converters (e.g., digital-to-analog converters and the like), mappers, a Fast Fourier Transform (FFT) module, and the like, to generate symbols for a transmission via one or more downlinks and to receive symbols (e.g., via an uplink). In some implementations, the base station is also compatible with GERAN, UTRAN, and E-UTRAN, and/or other standards and specifications as well. Moreover, the RF signals of downlinks and uplinks are configured in accordance with one or more of these standards and/or specifications. The processor 430 may also determine one or more reporting thresholds (e.g., the XXX_REPORTING_THRESHOLDs depicted at FIG. 3), generate one or more messages, and/or receive one or more messages, such as the messages described herein.

Figure 5:
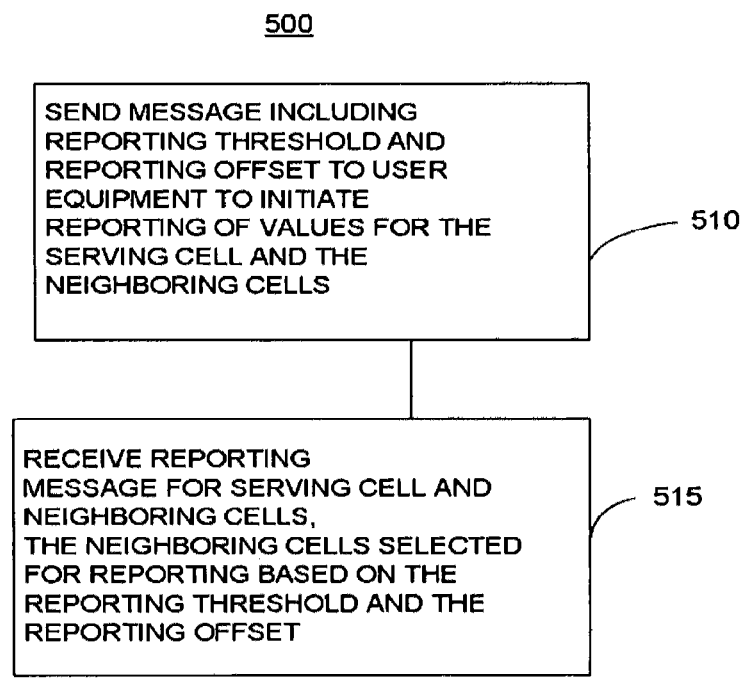
FIG. 5 depicts processing at the base station.

FIG. 5 depicts a process 500 used by the base station 400. At 510, the base station 400 may send a message, e.g., message 210, to the user equipment. The message 210 may indicate to the user equipment that measurement reporting (and/or enhanced measurement reporting) of the serving cell and/or neighboring cells should be initiated. In some implementations, the message 210 initiates periodic reporting of the measurement reports to the base station. In some implementations, the message 210 is used to provide configuration information to the user equipment (e.g., reporting offset, reporting threshold, and the like) rather than initiate measurement reporting. Moreover, the message may also indicate whether a scaling factor should be used by the user equipment to scale measured values. Moreover, the scaling factor may be specific to a given RAT.

At 515, the base station 400 may receive the measurement report message including values of the serving cell and the neighboring cells. Moreover, the value(s) reported for the neighboring cells may be determined using the reporting threshold, scaling factor, and/or the reporting offset described herein. The reported values in the measurement report message allow the network to determine whether a handover or a cell change order should be initiated to move the user equipment from a serving cell (and its corresponding base station) to one of the reported neighboring cells (and its corresponding base station).

Figure 6:
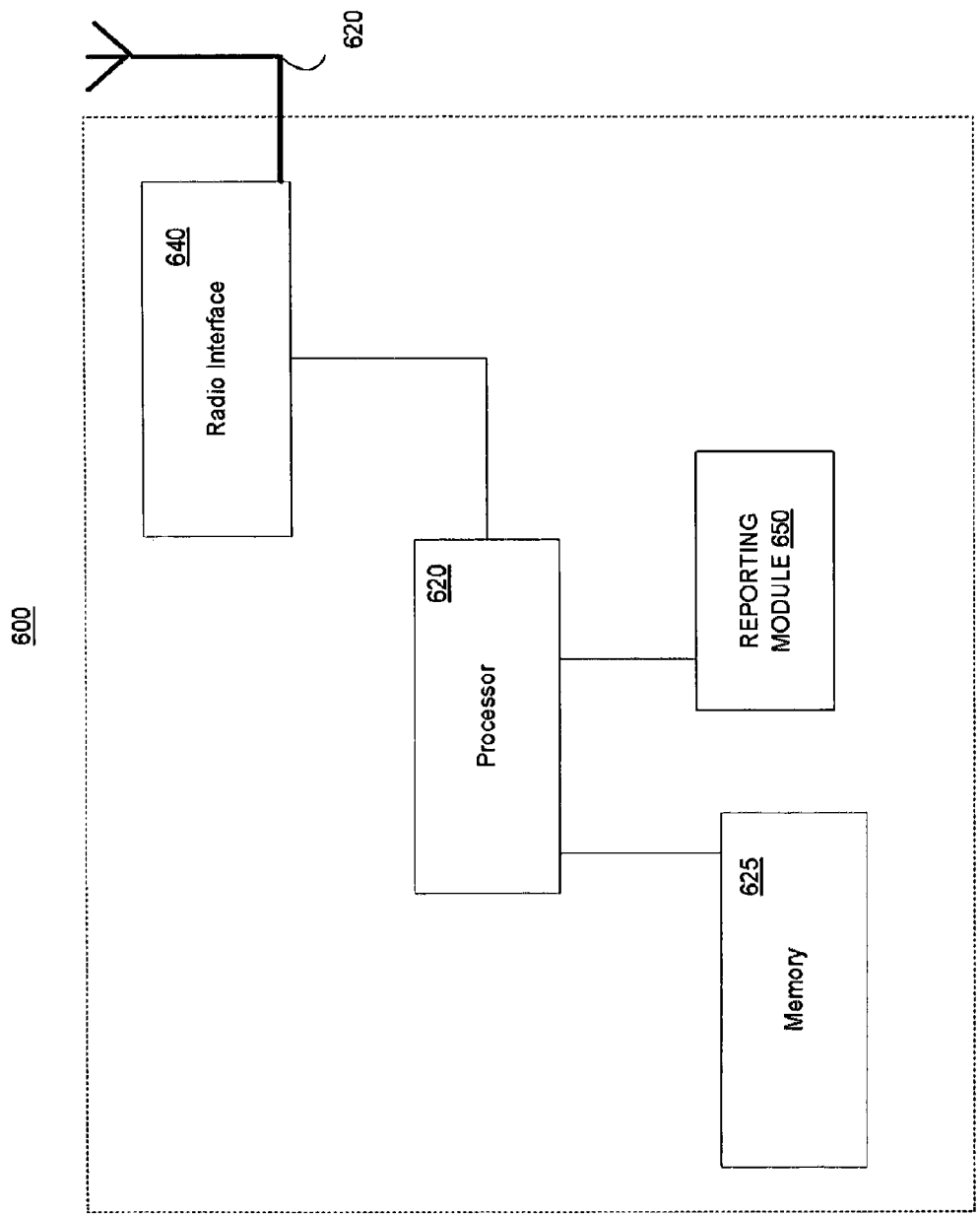
FIG. 6 depicts a user equipment.

FIG. 6 depicts a block diagram of user equipment 600, which may be used as user equipment 114A. The user equipment 600 includes an antenna 620 for receiving a downlink and transmitting via an uplink. The user equipment 600 also includes a radio interface 640, which may include other components, such as filters, converters (e.g., digital-to-analog converters and the like), symbol demappers, an Inverse Fast Fourier Transform (IFFT) module, and the like, to process symbols, such as OFDMA symbols, carried by a downlink or an uplink. In some implementations, the user equipment 600 is also compatible with GERAN, UTRAN, E-UTRAN, and/or other standards and specifications as well. The user equipment 600 further includes at least one processor, such as processor 620, for controlling user equipment 600 and for accessing and executing program code stored in memory 625. Moreover, the user equipment may include a reporting module 650 which may perform one or more operations related to the processes described herein which are attributed to the user equipment (e.g., collecting measurements from cells, calculating the CVs according to EQN 1, processing using the scaling factor, ranking, selecting which measurements get reported in the measurement report message(s), generating the message 240, sending the message 240, and the like).

Figure 7:
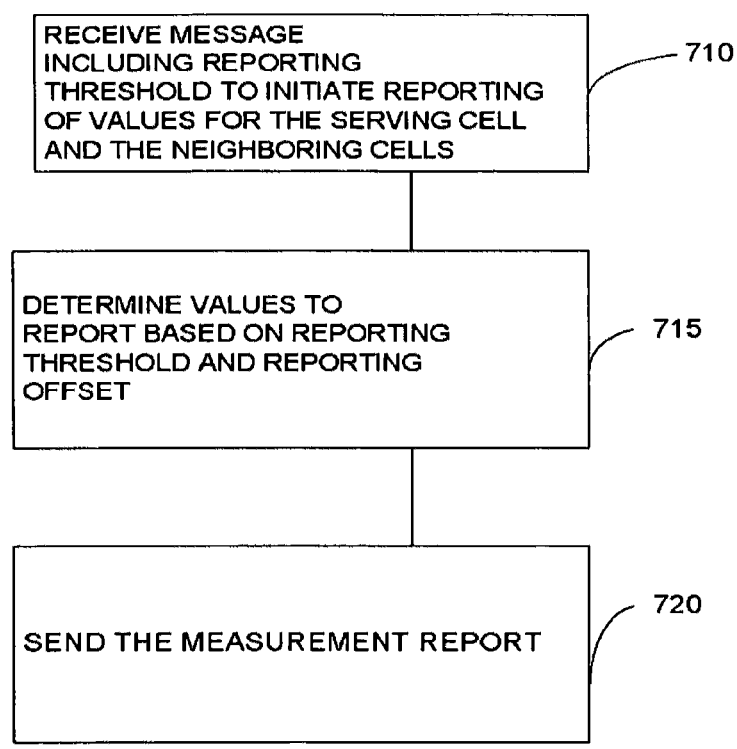
FIG. 7 depicts a process at the user equipment.

FIG. 7 depicts a process 700 used by user equipment 600 to report valid cells from the user equipment to the base station in a reporting message.

At 710, the user equipment receives a message. The user equipment may receive from base station 110 a message indicating that a measurement report message should be provided to the base station, although the received message may initiate periodic measurement report messages as well. The received message from the base station may also provide parameters to configure the reporting. For example, user equipment 114A may receive message 210 described above. The message 210 may also include the reporting thresholds and the reporting offsets for different RATs. For example, the message 210 may include reporting thresholds XXX_REPORTING_THRESHOLD for E-UTRAN cells and for UTRAN cells. The measurement values may also include, for example, signal levels and/or signal quality values. The user equipment 114A may measure measurement values for the serving cell (which is the cell currently being access by the user equipment 114A) and for any neighboring cells.

At 715, the user equipment determines values to report based on the reporting threshold and the reporting offset. For example, user equipment 114A may compare the signal levels and/or signal quality values of different cells (including cells of different RATs) using the comparison values, reporting threshold, and/or offsets derived by means of EQN 1 described above. Moreover, the comparison may also include the use of the scaling factor described above as well as the ranking of the comparison values as described above. In any case, the user equipment 114 selects one or more cells to report to the network based the comparison values, reporting threshold, and/or offsets, when the measurement report message lacks the capacity to report all of the valid cells At 720, the user equipment sends the measurement to the network (e.g., a network node, such as base station 110). For example, the user equipment 114A sends the measurement report message including the reported value (e.g., signal level and/or signal quality) for the serving cell and/or the reported value of the one or more cells selected in 715.

The subject matter described herein may be embodied in systems, apparatus, methods, and/or articles depending on the desired configuration. For example, the base stations and user equipments (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "machine-readable medium" refers to any computer program product, computer-readable medium, computer-readable medium, apparatus and/or device (e.g., magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Moreover, 3GPP TS 45.008, titled "$3^{rd}$ Generation Partnership Project; Technical Specification Group GSM/Edge Radio Access Network; Radio subsystem link control" (Release 9), 2009-11, (hereinafter 3GPP TS 45.008), is incorporated herein by reference in its entirety. To the extent that any of the incorporated material is inconsistent with the present disclosure, the present disclosure shall control.

Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

What is claimed:

1. A method comprising:
receiving, at a user equipment from a base station, a first message providing one or more parameters for measurement reporting;
selecting one or more first cells from among a plurality of cells, wherein the selecting is based on at least one comparison value determined based on at least one reporting threshold defined for at least one of a plurality of radio access technologies being used by at least one of the plurality of cells, wherein the at least one reporting threshold is further defined based on at least one measurement quantity used for the at least one of the plurality of radio access technologies; and
sending, by the user equipment to the base station, one or more measurement results for the selected one or more first cells, the one or more measurement results being comprised in a measurement report message; wherein responsive to the measurement report message lacking capacity to report valid measurement results for each of the plurality of cells, one or more measurement results are included in the measurement report message based on the at least one comparison value.

2. The method of claim 1, wherein the selecting further comprises:
scaling at least one of the one or more measurement results corresponding to the at least one measurement quantity measured from at least one of the plurality of cells.

3. The method of claim 1, wherein the one or more parameters further comprise at least one of an offset and the at least one reporting threshold.

4. The method of claim 1, wherein the selecting further comprises:
measuring, at the user equipment for each of the plurality of cells, the at least one measurement quantity, the at least one measurement quantity comprising at least one of a signal level and a signal quality.

5. The method of claim 1, wherein the selecting further comprises:
comparing measurement results from one or more of the plurality of cells, wherein comparing further comprises determining the at least one comparison value by summing a first measurement result and a first reporting offset to determine a sum, and subtracting from the sum a first reporting threshold.

6. The method of claim 5, further comprising:
calculating, for each of the plurality of cells, the at least one comparison value based on an equation as follows:

$$CV=Qmeas+REPORTING\_OFFSET-REPORTING\_THRESHOLD,$$

wherein the CV is the comparison value, Qmeas represents the first measurement result, the REPORTING_OFFSET represents the first reporting offset, and the REPORTING_THRESHOLD represents the first reporting threshold.

7. The method of claim 6, wherein the comparing further comprises:
scaling, based on a scaling factor, the at least one comparison value from at least one of the plurality of cells to enable a comparison with at least another scaled comparison value from another one of the plurality of cells.

8. The method of claim 1, wherein the selecting further comprises:
ranking measurement results from one or more of the plurality of cells, wherein the selecting uses the ranked scaled comparison values to determine the one or more first cells.

9. An apparatus comprising:
at least one processor; and
at least one memory, wherein the at least one processor and the at least one memory are configured to:
receive, at the apparatus from a base station, a first message providing one or more parameters for measurement reporting;
select one or more first cells from among a plurality of cells, wherein the select is based on at least one comparison value determined based on at least one reporting threshold defined for at least one of a plurality of radio access technologies being used by at least one of the plurality of cells, wherein the at least one reporting threshold is further defined based on at least one measurement quantity used for the at least one of the plurality of radio access technologies; and
send, by the apparatus to the base station, one or more measurement results for the selected one or more first cells, the one or more measurement results being comprised in a measurement report message; wherein responsive to the measurement report message lacking capacity to report valid measurement results for each of the plurality of cells, one or more measurement results are included in the measurement report message based on the at least one comparison value.

10. The apparatus of claim 9, wherein the apparatus is further configured to at least:
scale at least one of the one or more measurement results corresponding to the at least one measurement quantity measured from at least one of the plurality of cells.

11. The apparatus of claim 9, wherein the one or more parameters further comprise at least one of an offset and the at least one reporting threshold.

12. The apparatus of claim 9, wherein the apparatus is further configured to at least
measure, at the apparatus for each of the plurality of cells, the at least one measurement quantity, the at least one measurement quantity comprising at least one of a signal level and a signal quality.

13. The apparatus of claim 9, wherein the apparatus is further configured to at least
compare measurement results from one or more of the plurality of cells by at least determining the at least one comparison value by summing a first measurement result and a first reporting offset to determine a sum, and subtracting from the sum a first reporting threshold.

14. The apparatus of claim 13, wherein the apparatus is further configured to at least:
calculate, for each of the plurality of cells, the at least one comparison value based on an equation as follows:

$$CV=Qmeas+REPORTING\_OFFSET-REPORTING\_THRESHOLD,$$

wherein the CV is the comparison value, Qmeas represents the first measurement result, the REPORTING_OFFSET represents the first reporting offset, and the REPORTING_THRESHOLD represents the first reporting threshold.

15. The apparatus of claim 13, wherein the apparatus is further configured to at least:
scale, based on the scaling factor, the at least one comparison value from at least one of the plurality of cells to enable a comparison with at least another scaled comparison value from another one of the plurality of cells.

16. The apparatus of claim 1, wherein the apparatus is further configured to at least:
rank measurement results from one or more of the plurality of cells, wherein the select uses the ranked scaled comparison values to determine the one or more first cells.

17. A non-transitory computer-readable storage medium including code which when executed by at least one processor provides operations comprising:
receiving, at a user equipment from a base station, a first message providing one or more parameters for measurement reporting;
selecting one or more first cells from among a plurality of cells, wherein the selecting is based on at least one comparison value determined based on at least one reporting threshold defined for at least one of a plurality of radio access technologies being used by at least one of the plurality of cells, wherein the at least one reporting threshold is further defined based on at least one measurement quantity used for the at least one of the plurality of radio access technologies; and
sending, by the user equipment to the base station, one or more measurement results for the selected one or more first cells, the one or more measurement results being comprised in a measurement report message; wherein responsive to the measurement report message lacking capacity to report valid measurement results for each of the plurality of cells, one or more measurement results are included in the measurement report message based on the at least one comparison value.

18. The non-transitory computer-readable storage medium of claim 17, wherein the receiving further comprises:
scaling at least one of the one or more measurement results corresponding to the at least one measurement quantity measured from at least one of the plurality of cells.

19. A method comprising:
sending, from a base station to a user equipment, a first message providing one or more parameters for measurement reporting; and
receiving a measurement report message including one or more measurement results selected based on one or more comparison values determined based on at least one reporting threshold defined for at least one of a plurality of radio access technologies being used by at least one of a plurality of cells, when the measurement report message sent by the user equipment lacks capacity to report to the base station measured values for each of the plurality of cells.

20. The method of claim 19, wherein the one or more comparison values are scaled based on a scaling factor.

21. An apparatus comprising:
at least one processor; and
at least one memory, wherein the at least one processor and the at least one memory are configured to:
send, from the apparatus to a user equipment, a first message providing one or more parameters for measurement reporting; and
receive a measurement report message including one or more measurement results selected based on one or more comparison values determined based on at least one reporting threshold defined for at least one of a plurality of radio access technologies being used by at least one of a plurality of cells, when the measurement report message sent by the user equipment lacks capacity to report to the apparatus measured values for each of the plurality of cells.

22. The apparatus of claim 21, wherein the one or more comparison values are scaled based on a scaling factor.

23. A non-transitory computer-readable storage medium including code which when executed by at least one processor provides operations comprising:
sending, from a base station to a user equipment, a first message providing one or more parameters for measurement reporting; and
receiving a measurement report message including one or more measurement results selected based on one or more comparison values determined based on at least one reporting threshold defined for at least one of a plurality of radio access technologies being used by at least one of a plurality of cells, when the measurement report message sent by the user equipment lacks capacity to report to the base station measured values for each of the plurality of cells.

24. The non-transitory computer-readable storage medium of claim 23, wherein the one or more comparison values are scaled based on a scaling factor.

* * * * *